United States Patent [19]

Gallagher

[11] 3,929,587

[45] Dec. 30, 1975

[54] APPARATUS AND METHOD FOR MAINTAINING A STABLE ELECTROLYTE IN OXYGEN ANALYSIS

[75] Inventor: John P. Gallagher, Wilmington, Mass.

[73] Assignee: Delta F Corporation, Woburn, Mass.

[22] Filed: Sept. 23, 1974

[21] Appl. No.: 508,351

[52] U.S. Cl. ............ 204/1 T; 204/195 R; 204/237; 204/275; 204/277; 204/278
[51] Int. Cl.² .................. G01N 27/28; G01N 27/46
[58] Field of Search ........ 204/237, 238, 239, 195 R, 204/195 T, 195 P, 1 T, 275, 276, 277, 278; 324/29

[56] References Cited
UNITED STATES PATENTS

| | | | |
|---|---|---|---|
| 2,805,191 | 9/1957 | Hersch | 204/1 T |
| 2,886,496 | 5/1959 | Eckfeldt | 204/1 T |
| 3,461,042 | 8/1969 | Martin et al. | 204/1 T |

Primary Examiner—G. L. Kaplan
Attorney, Agent, or Firm—Richard L. Stevens

[57] ABSTRACT

A reservoir of electrolyte is placed in communication with the electrolyte of an electrolytic cell, which electrolytic cell is adapted for oxygen analysis. An anode is placed in the reservoir, a cathode is placed in the cell, and a potential applied to generate a current between the cathode and the anode. A pH gradient is established, and the neutralization products formed, such as by the introduction of acid gases such as chlorine and carbon dioxide, migrate to the anode and the reservoir. The neutralization products are emitted from the reservoir and the electrolyte in the cell is maintained in a stable state.

17 Claims, 3 Drawing Figures

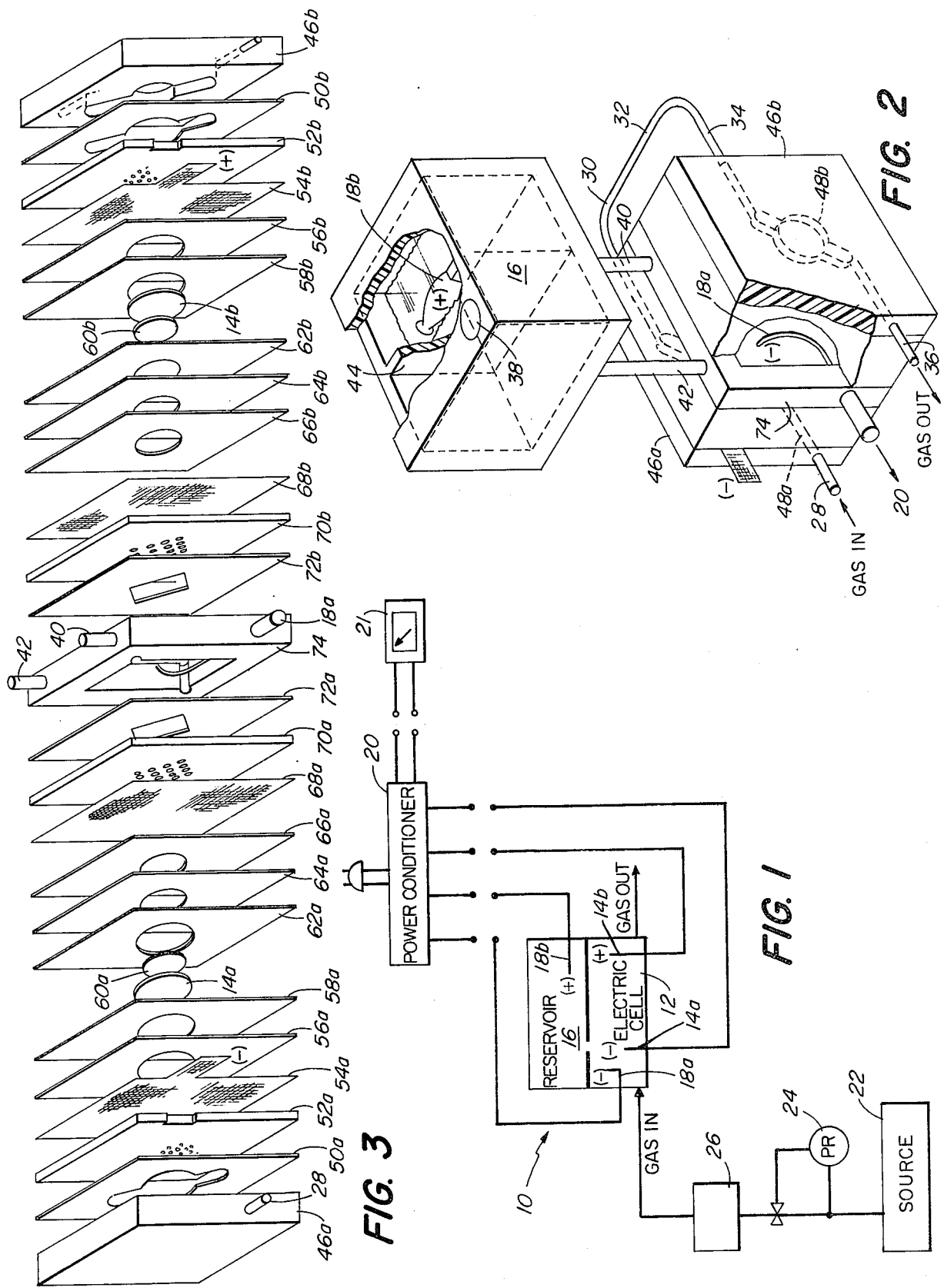

3,929,587

APPARATUS AND METHOD FOR MAINTAINING A STABLE ELECTROLYTE IN OXYGEN ANALYSIS

BACKGROUND OF THE INVENTION

An electrochemical cell, in simplest terms, consists of an anode (the oxidizing electrode), a cathode (the reducing electrode) and an electrolyte. In order for the electrochemical cell to function, the electrolyte must be compatible with the mechanisms of oxidation and reduction at the electrodes. As well, it must provide a conductive path for the transport of ionic species between the electrodes.

The electrochemical cell concept is broadly applied in industrial and scientific operations. Electrolytic cells are used in electroplating, water purification, and the production of high purity gases and metals while galvanic cells (batteries and fuel cells) provide a convenient means of energy storage and generation.

Also, due to their very high level of sensitivity, electrochemical cells are used for measurement in a variety of analytical procedures and many laboratory and process control instruments depend on the electrochemical cell as the sensor element for their function.

In the design of any electrochemical cell the choice of electrolyte is of primary importance. Considerable study has been given to identify the compositions and concentrations of electrolytes which will produce the best results in a wide variety of cell systems and applications.

In most instances, the electrolyte in an operating cell has a precise composition, at which optimum performance will result. A severe change in electrolyte composition generally will result in significant diminuation of the cell's performance efficiency. Unfortunately, the electrolyte in an operating electrochemical cell usually undergoes change as a result of the cell's electrode reactions. Depending on the particular electrode and the reactions involved, chemical species may become altered or may accumulate in and/or be depleted from the electrolyte.

In some instances the change in electrolyte composition does not cause major difficulties in the operation of an electrochemical cell. For example, in electroplating, depletion of chemical species can most often be adjusted by simple chemical addition. Also, water replenishment can be made without difficulty in most aqueous electrolyte systems (i.e., the lead-acid automobile battery).

In other applications, however, the ability to "reconstitute" the electrolyte is either very difficult or impossible and electrolyte replacement becomes the only reasonable alternative.

In the utilization of electrochemical cells as sensor elements in analytical instruments, the requirement to maintain a consistent electrolyte composition is commonly required in order to ensure the accuracy of measurement. For example, in the determination of oxygen in fluids by electrochemical methods, this has been found to be the case. Further, in low temperature caustic electrolyte systems, the sample stream introduced into the electrolytic cell commonly contains components other than the one to be analyzed. These other components, for example, carbon dioxide, introduced into a stream for oxygen analysis result in a neutralization reaction forming neutralization products. This reduces the transfer of ions through the electrolyte, causing drift of measurement in the analysis. As well, electrolytic cell systems, including those which operate on the Hersch cell principle, are limited due to the fact that they have a reactive anode much like that of a standard battery. The present specification discloses an invention which overcomes the drift in measurement caused by neutralization products.

SUMMARY OF THE INVENTION

The present invention relates to a method and apparatus for the removal of neutralization products or unwanted species from an electrolyte, which products would, if not removed, interfere with the function of a separate electrochemical operation. In my invention, a method and apparatus is provided wherein drift of measurement caused by neutralization products is minimized or eliminated and the electrolyte in a cell is stabilized. A reservoir of electrolyte is placed in communication with the electrolyte of an electrolytic cell. The cell includes sensing electrodes for the component in the fluid stream to be analyzed. In the electrolysis of the component other components in the stream, although they will not directly affect the reactions at the sensing electrodes, interfere with the migration of ions from one sensing electrode to another by forming neutralization products.

The reservoir of electrolyte includes a first electrode therein. A second electrode is disposed in the electrolyte of the cell and a potential is established across the first and second electrodes to provide a pH gradient. An electrolytic path is established between the first and second electrodes and through the common electrolyte. The gradient established results in migration of positive ions to the cathode (negative electrode) and of negative ions to the anode (positive electrode). If the electrolyte is caustic, acid components contained in a gas stream will cause a neutralization reaction when they are absorbed. If the electrolyte is acid, basic components will cause a neutralization reaction. The first electrode is designed to attract neutralization products of opposite polarity. For a caustic electrolyte, the anions will migrate to the first electrode in the reservoir.

By the proper configuration of the flow path between the reservoir and the cell and the application of a proper current level between the electrodes, a pH gradient can be established. This results in zones about the first and second electrodes being more acidic or basic than the bulk electrolyte. The flow path between the cell and the reservoir is dimensioned to prevent or inhibit the back diffusion of the neutralization products from the reservoir to the cell.

In a preferred embodiment where the electrolyte is caustic, the zone about the first electrode has a concentration of hydrogen ions and is acidic with reference to the bulk electrolyte. The removal of neutralization products from the cell is accomplished by their migration to the first electrode in the reservoir. The flow path inhibits their back diffusion to the cell. As the neutralization products enter the acidic zone they may be removed depending upon their chemical composition in either of two ways. They may be electrochemically reduced and evolved as a gas or, because of their accumulation, the solubility limit is reached and they may be effervesced, e.g., carbon dioxide. If the electrolyte is acidic, the basic gases, such as ammonia, will migrate toward the first electrode in the reservoir. By making that electrode the cathode (negative), the zone about the reservoir will be essentially basic in reference to the bulk electrolyte. When the solubility limit for the ammonia in the zone about the electrode is reached, the ammonia will effervesce.

The preferred embodiment of the invention provides a method and apparatus for the removal of neutralization products formed during the electrochemical analysis of oxygen. A low temperature liquid electrolyte analyzer system is provided which contains a caustic, such as a potassium hydroxide solution and sensing electrodes specific for oxygen. When the solution is exposed to acid gases, such as carbon dioxide and chlorine, a neutralization reaction occurs, as is well known. This neutralization has the effect of reducing the hydroxyl ion concentration to a level in the cell, such that the transfer of oxygen through the electrolyte is severely restricted. To prevent the accumulation of the neutralization products, the electrolyte cavity in the cell is connected to a reservoir having a first or positive electrode. The electrolyte cavity includes a second or negative electrode spaced apart from the sensing electrodes. If the electrolyte contained only potassium hydroxide, only the hydroxyl ion would migrate to the positive electrode. However, with the absorption of acid gases, such as carbon dioxide and chlorine into the electrolyte from the sample stream, carbonate ions are formed by the reaction of carbon dioxide with hydroxyl solution, the carbonate ions and chloride ions will migrate to the positive electrode.

At the positive electrode, where only hydroxyl anions are present, oxygen will be evolved. When chloride ions are present, however, they will also evolve along with some oxygen. Elimination of carbon dioxide from the electrolyte does not occur as a result of the direct action of the electrode, since the carbonate ion cannot be so oxidized electrochemically. The carbon dioxide level in the electrolyte is, however, reduced by constructing a proper configuration of an electrolyte path between the positive and negative electrodes. The current level passed between the same electrodes establishes a pH gradient. The application of the current between the two electrodes placed within the electrolyte causes the electrolyte at the positive electrode to become more acidic or concentrated in hydrogen ions than that of the bulk electrolyte while the pH of the electrolyte in the immediate vicinity of the negative electrode can be made more basic than the bulk solution. This concentration of hydrogen ions about the electrode in the reservoir achieves the rejection of the carbon dioxide gas by providing a zone about the electrode which is acidic in reference to the bulk of the electrolyte. The electrolysis current that passes between the electrodes causes the carbonate ions to migrate to the reservoir chamber. Conversely, the same current causes the potassium ions to migrate toward the negative electrode, which is in the cell cavity. As the pH decreases at the positive electrode, that is, as the electrolyte becomes more acidic, then the carbon dioxide in the electrolyte reaches saturation and begins to effervesce from the electrolyte. Until the carbon dioxide reaches saturation, it remains segregated from the cell cavity in the reservoir. The current between the electrodes in the reservoir and the cavity cell must be such as to drive the carbonate ions out of the the cell cavity at a rate sufficient to maintain the electrolyte in the cell cavity at a reasonably high pH. The flow path between the reservoir and the cell cavity is configured such to minimize the back diffusion of the carbonate ion to the cell cavity due to the concentration difference.

The method of my invention includes providing a reservoir of electrolyte in communication with the electrolyte of an electrolytic cell, establishing and maintaining a pH gradient between the electrolyte in the reservoir and the electrolyte in the cell to provide for the migration of neutralization products into the reservoir, inhibiting the back diffusion of the neutralization products from the reservoir into the cell and emitting the neutralization products from the reservoir, whereby a stable electrolyte is maintained.

The apparatus of my invention comprises a reservoir in communication with an electrolytic cell and an electrolyte common both to the reservoir and the electrolytic cell, a first electrode disposed in the reservoir and a second electrode disposed in the electrolytic cell and means to generate an electrolysis current between the first and second electrode and through the common electrolyte to provide a pH gradient between the electrodes, such that the neutralization products or other unwanted (interfering) ionic species formed in the electrolyte of the electrolytic cell migrate to the reservoir and are emitted therefrom or are accumulated therein.

BRIEF DESCRIPTION OF THE DRAWINGS

FIG. 1 is a functional block diagram of an embodiment of the invention;

FIG. 2 is a perspective representation of an embodiment of the invention; and

FIG. 3 is a perspective illustration in exploded view of an electrolytic cell.

DESCRIPTION OF THE PREFERRED EMBODIMENT(S)

In FIG. 1, a block functional diagram of the electrolytic system 10 of the preferred embodiment of the present invention is shown and includes an electrolytic cell 12 having sensing electrodes 14a and 14b disposed therein. A reservoir 16 is in fluid flow communications with the cell 12 and includes an electrode 18b. The electrolyte used is common to the cell 12 and the reservoir 16. An electrode 18a is disposed in the cell 12. The load for the electrodes 14a and 14b is provided by a first separate D.C. circuit in a power conditioner 20. The electrolyte in the cell 12, with the electrodes 14a and 14b completes the electrolytic circuit. The power conditioner 20 provides the load for the electrodes 18a and 18b and the electrolyte common to the cell 12 and reservoir 16 by a second separate D.C. circuit. Although not shown, the power conditioner will include the appropriate resistors, amplifiers, etc. in order to control specifically the load applied to each set of electrodes. A volt meter 21 communicates with the electrodes 14a and 14b via the power conditioner 20 to provide a direct reading corresponding to the electrochemical oxidation and reduction of the component to be analyzed.

A source 22 containing the gaseous stream to be analyzed is upstream of a pressure regulator 24 and a filter 26 which control the flow rate and purity of the stream entering the sensor cell 12.

Referring to FIG. 2, the cell 12 and the reservoir 16 are shown in greater detail. The gaseous stream containing the component to be analyzed flows from the source 22 through an inlet 28 and into an inlet plate 46a. The gaseous stream flows through a flow passage 48a, defined in the plate 46a, and out an outlet 30. A portion of the gaseous stream is converted to an ionic species and is transported through the electrolyte in the sensor cell 12. A conduit 32 is secured to the outlet 30 and to an inlet 34 on an outlet plate 46b. The gaseous stream flows through a flow passage 48b, defined in the plate 46b and is discharged through outlet 36.

The reservoir 16 is box-like and includes an aperture 38 whereby electrolyte may be added to the reservoir and the cell as desired. The floor of the reservoir 16 sealingly receives the conduits 40 and 42 to provide for the fluid flow communication of electrolyte between the reservoir 16 and the cell 12. A partition 44 is provided and its upper wall spaced slightly apart from the top of the reservoir 16. The electrode 18b, consisting of a metal such as platinum, passes through a wall of the reservoir and communicates with the power conditioner 20.

The cell 16, shown in an exploded view in FIG. 3, comprises a plurality of sections which are assembled in sealing engagement. The inlet plate 46a includes the inlet 28 and the outlet 30, previously described. A gasket 50a engages the inner surface of the inlet plate 46a and the upstream side of an apertured diffusion plate 52a which meters a portion of the gaseous stream flowing through the plate 46a therethrough. A current collector 54a is sandwiched between a wax plate 56a having an aperture therein and the diffusion plate 52a. A plastic spacer 58a has an aperture, into which the electrode 14a is received. An asbestos mat 60a is received in the aperture of a second gasket 62a, while a third gasket 64a abuts the second gasket 62a. The gasket 64a has an aperture of smaller dimension than the mat 60a. When assembled, the mat 60a is positioned securely.

A gasket 66a, a screen 68a, and a support plate 70a insure with the asbestos mat 60a the dimensional integrity of the electrode 14a. A gasket 72a is interposed between the support plate 70a and an electrolyte cavity 74, which electrolyte cavity receives the conduits 40 and 42 in the upper portion thereof. The electrode 18a, such as a wire platinum electrode, passes through the cell wall and communicates with the power conditioner 20.

The components which comprise the other half or downstream side on the electrolytic cell 16 are simply reversed in position and are identified as 46b, 50b, etc. However, the electrode 14b may be of a different structure and composition than the electrode 14a. Also, the diffusion plate 52b may have the apertures therein configured differently than that of 52a, in that the flow rate of the gas from the electrolyte back into the main flow of the stream through the sensing cell is not as critical as the flow into and upstream of the sensing electrode 14a.

Operation

In the operation of the invention, an electrolyte comprising a solution of one molar potassium hydroxide-one molar potassium carbonate in an amount of approximately 90 milliliters is introduced into the cell and reservoir cavities through the aperture 38 on the top of the reservoir 16. The conduits 40 and 42 provide fluid flow communication between the reservoir and the cell.

The current collectors 54a and b, specifically, the extending tabs on the current collectors shown in FIGS. 2 and 3, are connected to the power conditioner 20 through appropriate connectors (not shown). The polarities are as indicated in the drawings. This establishes a first electrolytic path between the sensing electrodes 14a and b.

The electrodes 18a and b are connected to the power conditioner 20 through appropriate connectors (not shown). Again, the polarities are as indicated in the drawings. This establishes a second electrolytic path between the electrodes 18a and b and the common electrolyte. Thus, first and second electrolytic paths are established.

Referring to the second electrolytic path, resistance to current flow that results in this particular cell configuration is equivalent to approximately 100 ohms. A potential of approximately 12 volts D.C. is applied across the electrode 18a, which is nickel and functions as a cathode, and the electrode 18b, which is platinum and functions as an anode (over potential at the electrodes is accounted for) and a continuous current of between 25–50 milliamps is generated through the second electrolytic path. The relatively high resistance of 100 ohms that exists between the electrodes 18a and b is due primarily to the approximately 2½ inch long × ⅛ inch conducting path, conduit 40, that connects the reservoir 16 and the cell 12. This path is designed to create a barrier to the back diffusion of anions, such as the carbonate and chlorine ions as they migrate to the electrode 18b.

The gas sample flows from a source 22 into the inlet 28 at a rate of about 1.0 scfh A flow rate of between 0.3 to 3.0 scfh is preferred. The gas may be at a temperature of between 32°–150°F and at a pressure of about 1 lb. psi gauge. For illustrative purposes, the invention will be described in reference to a gaseous composition of 0.1% oxygen (1000 ppm), 15% carbon dioxide, 3% chlorine, and the remainder nitrogen.

The sensor 14a, which functions as a cathode, may be any semi-permeable electrode catalytically specific for oxygen. A non-specific cathode may be used as long as the reduction of the oxygen at the cathode is proportional to the oxygen entering the electrolytic cell.

With 1000 ppm oxygen partial pressure across the diffusion barrier 52, 0.6 cc per hour of oxygen flows to the cathode sensor 14a. This rate of oxygen exposed to the sensor 14a will result in a current flow of approximately 3 mA in the cell. The power conditioner 20 communicating with the collecting screens 54a and b has an applied potential in the range of 0.6 to 1.7 volts D.C., approximately 1.2 volts D.C. being preferred. The sensor 14b, which functions as an anode, is illustrated as the same type of semi-permeable electrode catalytically specific for oxygen, such as a Teflon-carbon electrode. However, a solid metal electrode, such as platinum, gold, etc., may also be used.

In this embodiment, the oxygen is reduced at the electrode 14a. The applied potential provides the driving force for the transport of the anions or hydroxyl ions $OH^-$. The hydroxyl ions complete the first electrolytic path between the sensors 14a and b.

When the acid gases $CO_2$ and $Cl_2$ enter the electrolytic solution, a neutralization reaction occurs and they are ionized as anionic species and are absorbed by the electrolyte in the sensor cell cavity. This neutralization has the effect of reducing the hydroxyl ion concentration to a level such that the transfer of oxygen through the electrolyte is severely restricted. The oxygen is being reduced by the sensor cathode 14a. Hydroxyl ions form the electrolytic path between the sensors 14a and b and move to and contact the sensor anode 14b. At the sensor anode 14b, the hydroxyl ions are oxidized. The anionic species of the carbonate and chlorine ions are absorbed in the electrolyte of the cell. The second electrolytic path between the electrodes 18a and b has a current of between 25 and 50 mA. The anions move or migrate toward the electrode 18b in the reservoir 16, primarily passing through the conduit 40. If the electrolyte contained only potassium hydroxide, only the hydroxyl ions would migrate to the electrode 18b. However, with the adsorption of acid gases such as carbon dioxide and chlorine into the electrolyte, carbonate ions which are formed by the reaction of carbon dioxide with the hydroxyl solution, and the chloride ions migrate to the electrode 18b. The potassium ions tend to accumulate around the nickel electrode 18a. Since the potassium is unstable in an aqueous medium, hydrogen gas will be continuously generated at the electrode 18a. A surplus of potassium ions over and above the acid gas anions will establish a basic pH in the sensor cell cavity, thus allowing the sensor cell to maintain its capability to transport oxygen, in the form of the hydroxyl ions, in its function of oxygen detection.

The construction of the path 40 with the partition 44 prevents the back diffusion of the anionic species, specifically the carbonate and chlorine ions, to the sensor cell. The chlorine ions participate directly in the electrode oxidation reaction at the electrode 18b and evolve. The carbonate ions do not participate in the direct electrode reaction at 18b and accumulate in the reservoir cavity until the equilibrium saturation is reached. Beyond this point, the carbon dioxide gas begins to effervesce. Thus, at the electrode 18b, the neutralization products are emitted and the electrolyte in the cell cavity is stabilized such that the migration of hydroxyl ions through the electrolyte is not interfered with. In the presence of hydroxide solution only, that is, where only hydroxyl ions are present, oxygen will be evolved. When they are present, chlorine ions will also evolve.

If the carbon dioxide or if a component such as sulfur dioxide were present in trace amounts, for example, less than 100 ppm, then the saturation points will in all likelihood not be reached in a particular analysis of a fluid component. If the saturation point is not reached, then the carbonate ions or sulfate ions will remain segregated from the electrolyte of the sensor cell cavity and simply continue to accumulate in the reservoir.

The invention has been described in reference to maintaining a stable caustic electrolyte wherein oxygen is analyzed. The concept of the invention may be employed in any electrochemical operation wherein a specific component(s) is involved in an electrochemical operation to remove neutralization products or unwanted species from the electrolyte. The electrolyte may be basic or acidic. By the proper placement of the cathode and anode, the application of the current and the dimensioning of the flow path between the reservoir and the electrolytic cell, the neutralization products may be removed as desired. Further, the invention may be used for the removal of carbonate ions which slowly build up in air-operating alkaline fuel cells. In this instance, the carbonate is formed when the electrolyte absorbs $CO_2$ (approximately 0.03% by volume) from ambient air. As well, the basic concept may be utilized to remove $SO_2$ (which may be intentionally absorbed as in an $SO_2$ scrubber), such that the formation of precipitated sulfite and bisulfate salts is avoided.

The principle of designing electrolytic cells in a configuration such that the marked pH gradient results upon application of a continuous current may be utilized to develop different pH profiles across numerous types of electrolytes. The variables which affect the cell pH profile include the composition and concentration of the electrolyte, the configuration of the resistive electrolyte path separating the electrodes and the current level in the cell. The invention thus relates to any application to remove interfering components such as unwanted neutralization products and/or species in an electrolyte such that it maintains the electrolyte in a condition that enhances the function of a separate electrochemical operation which is simultaneously being performed in utilization of either all or a portion of the same electrolyte.

Having described my invention, what I now claim is:

1. In an electrolytic cell in which a component introduced into the cell is reduced at one cell electrode and oxidized at the other cell electrode and where a neutralization reaction occurs forming neutralization products because of the introduction of components other than the components to be measured, thereby reducing the ionic transfer capacity of the electrolyte, the improvement which comprises:
   a. first means to generate an electrolytic current between the cell electrodes;
   b. a reservoir of electrolyte in communication with the electrolyte of the cell;
   c. a first electrode disposed in the electrolyte of the reservoir;
   d. a second electrode disposed in the electrolyte of the cell;
   e. second means to generate an electrolysis current between the first and second electrodes said second means independent of the first means which current results in a pH gradient between said first and second electrodes and which current effects the migration of ionic species that may cause neutralization products to be formed in the electrolyte of the cell to the first electrode, the zone about the first electrode having a concentration of hydrogen ions such that the ionic species which tend to form neutralization products remain segregated from the electrolyte of the electrolytic cell; and
   f. means to inhibit the back diffusion of said ionic species from the zone about the first electrode to the electrolyte of the cell.

2. The cell of claim 1, wherein the means to inhibit the back diffusion includes at least one conduit between the cell and the reservoir.

3. The cell of claim 1, wherein the electrode in the reservoir is an anode.

4. The cell of claim 1, wherein the electrolyte in the cell is caustic.

5. The cell of claim 1, which includes electrodes catalytically specific for oxygen analysis.

6. A method of stabilizing an electrolyte in an electrolytic cell in which unwanted ionic species are formed during an electrochemical operation which includes:
   a. providing an electrolytic cell having a pair of sensing electrodes disposed therein, the electrodes specific for a component to be analyzed in a fluid stream, the electrodes completing a first electrolytic path;
   b. providing a reservoir of electrolyte in communication with the electrolyte of the cell and including a second pair of electrodes, one of said electrodes disposed in the reservoir of electrolyte and the other of said electrodes disposed in the electrolyte of the cell, which pair of electrodes provides a second electrolytic path, the function of which path is independent of the function of the first electrolytic path;

c. imposing an electrical current between the second pair of electrodes resulting in a pH gradient between the electrolyte of the reservoir and the electrolyte of the cell to provide for the migration of other ionic species which are introduced into the electrolyte to the reservoir, which species do not directly affect reactions at the sensing electrode; and d. restricting the back diffusion of the unwanted ionic species from the reservoir into the cell, whereby the unwanted ionic species remain segregated from the electrolyte of the electrolytic cell.

7. The method of claim 6, which includes:

flowing a gaseous stream comprising oxygen and at least one acid gas into the cell, which acid gas forms neutralization products;

measuring the amount of oxygen in the stream by an electrochemical operation;

flowing the neutralization products into the reservoir; and emitting the neutralization products from the reservoir.

8. The method of claim 7, wherein the acid gases include carbon dioxide and chlorine, and which includes emitting the carbon dioxide by effervescence and emitting the chlorine by evolution.

9. The method of claim 6, wherein the electrolytes are caustic.

10. The method of claim 6, which includes establishing a zone of hydrogen ions in the electrolyte of the reservoir of a different concentration than the hydrogen ions in the bulk electrolyte.

11. The method of claim 6, which includes emitting the ionic species from the reservoir by effervescence.

12. The method of claim 6, which includes emitting the ionic species by evolving said products.

13. The method of claim 6, which includes:

segregating the ionic species from the electrolyte of the electrolytic cell; and maintaining the ionic species in a segregated state in the reservoir.

14. A method of stabilizing an electrolyte in an electrolytic cell in which unwanted ionic species are formed during an electrochemical operation which includes:

a. providing an electrolytic cell having a sensing electrode pair therein, which electrodes are catalytically specific for oxygen, and further wherein the electrolyte in the electrolytic cell is caustic, the electrodes completing a first electrolytic path;

b. providing a reservoir of electrolyte in communication with the electrolyte of the cell including a second pair of electrodes, one of said electrodes disposed in the reservoir of electrolyte and the other of said electrodes disposed in the electrolyte of the cell, which pair of electrodes provides a second electrolytic path, the function of which path is independent of the function of the first electrolytic path;

c. imposing an electrical current between the second pair of electrodes resulting in a pH gradient between the electrolyte of the reservoir and the electrolyte of the cell to provide for the migration of other ionic species which are introduced into the electrolyte to the reservoir, which species do not directly affect reactions at the sensing electrode; and d. restricting the back diffusion of the unwanted ionic species from the reservoir into the cell, whereby the unwanted ionic species remain segregated from the electrolyte of the sensing cell.

15. The method of claim 14 which includes establishing a zone of hydrogen ions in the electrolyte of the reservoir of a different concentration than the hydrogen ions in the bulk electrolyte.

16. The method of claim 15 which includes:

flowing a gaseous stream comprising oxygen and at least one acid gas into the cell, which acid gas forms neutralization products;

measuring the amount of oxygen in the stream by an electrochemical operation;

flowing the ionic species which may form neutralization products into the reservoir; and emitting the ionic species which may form neutralization products from the reservoir.

17. The method of claim 16, wherein the acid gases include carbon dioxide and chlorine, and which includes emitting the carbon dioxide by effervescence and emitting the chlorine by evolution.

* * * * *